Figure 1:
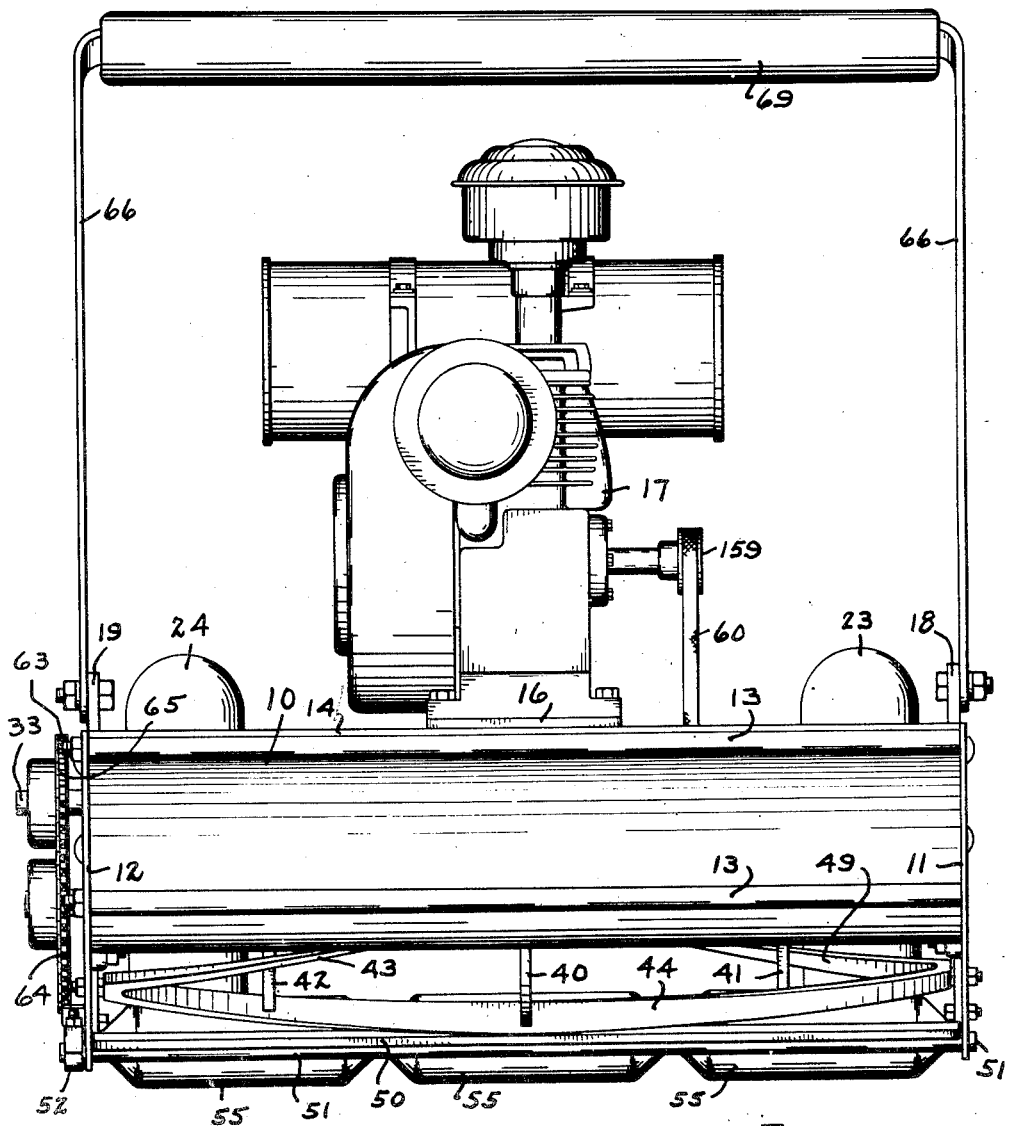

July 29, 1952 — T. E. BASH — 2,604,747

POWER-DRIVEN LAWN MOWER

Filed Jan. 7, 1948 — 4 Sheets-Sheet 1

INVENTOR,
THOMAS E. BASH,
By Herbert A. Minturn,
ATTORNEY.

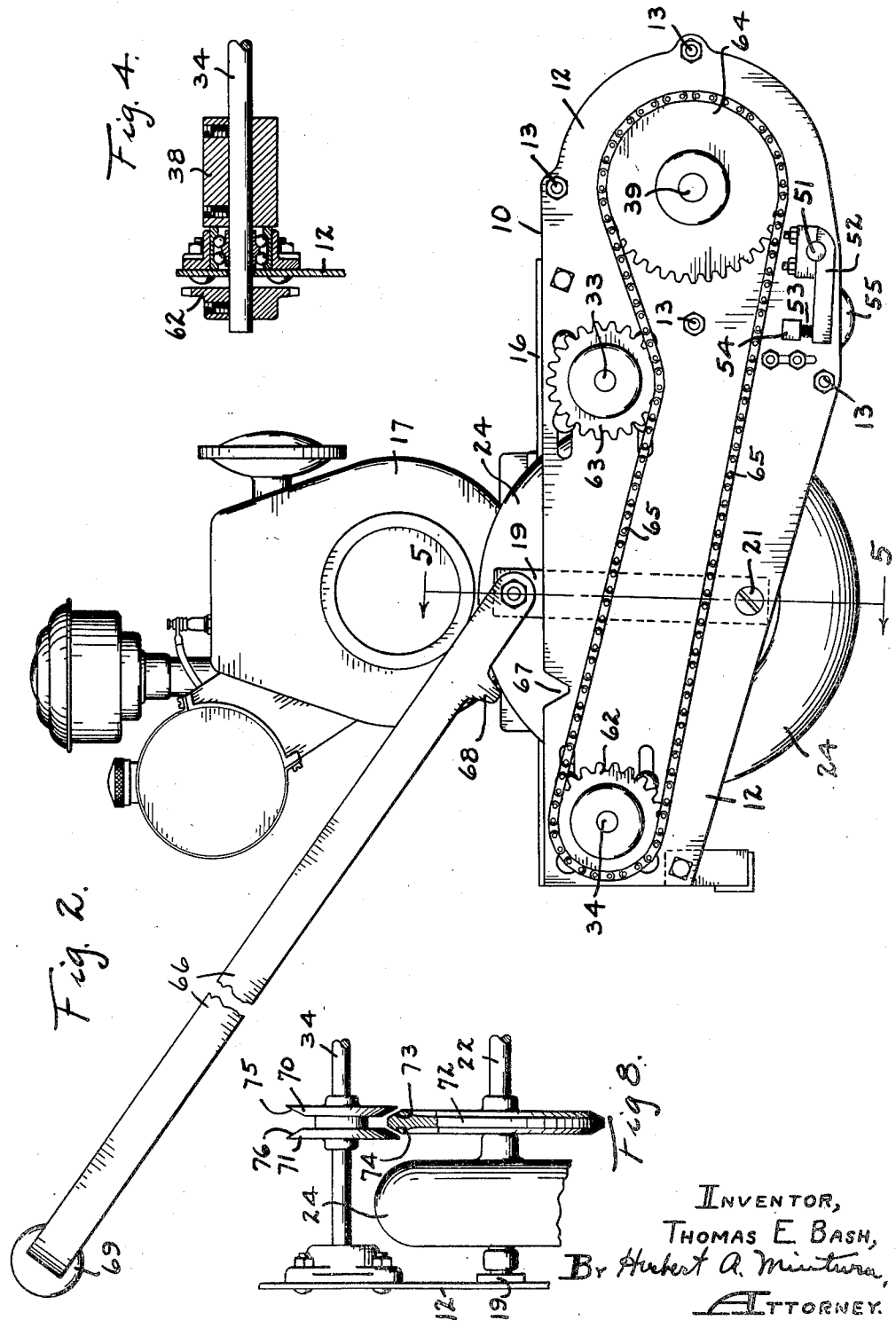

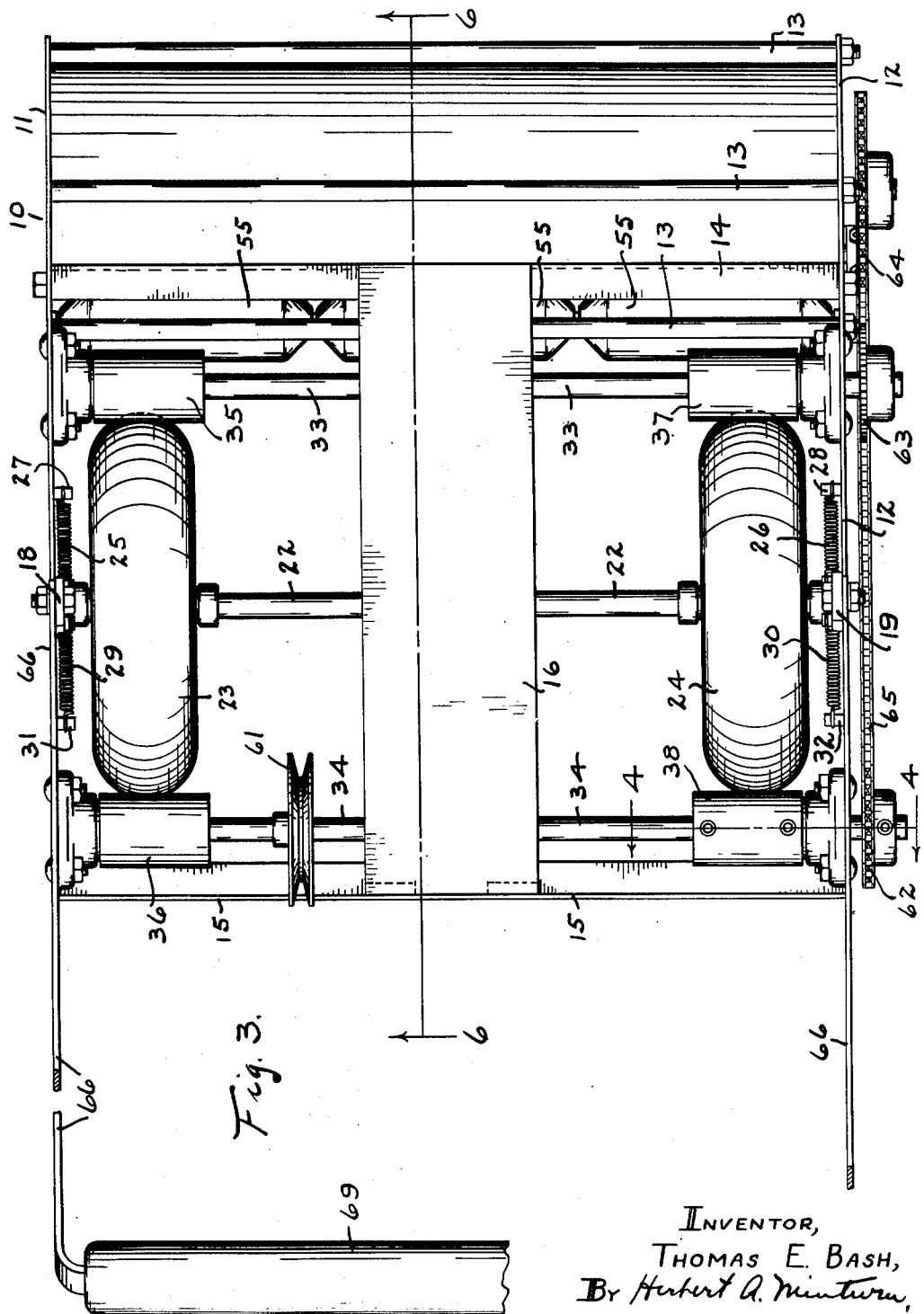

July 29, 1952 — T. E. BASH — 2,604,747
POWER-DRIVEN LAWN MOWER
Filed Jan. 7, 1948 — 4 Sheets-Sheet 4
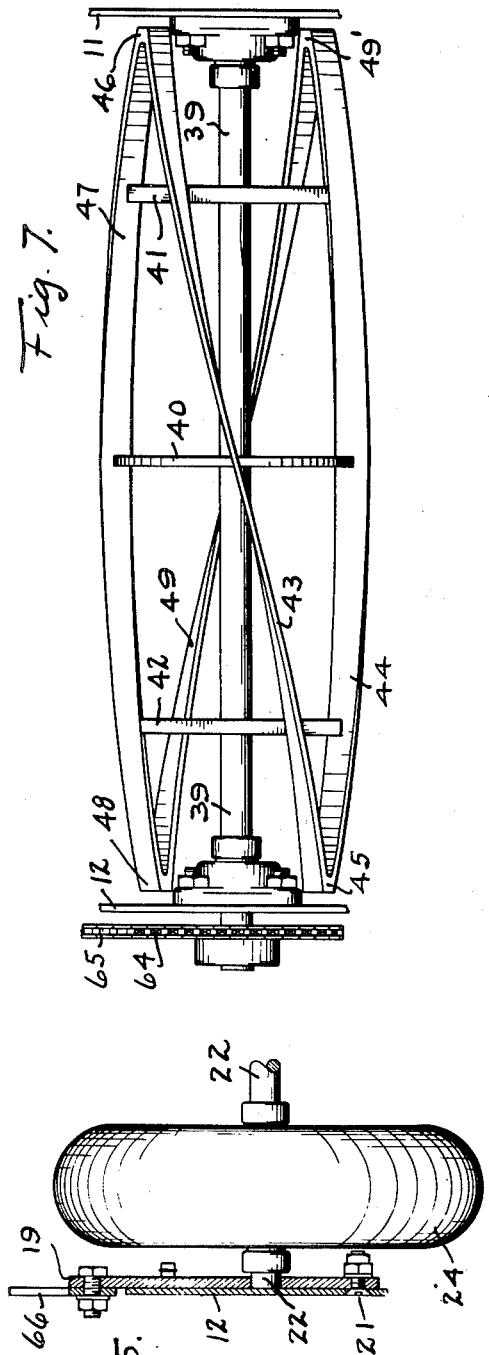
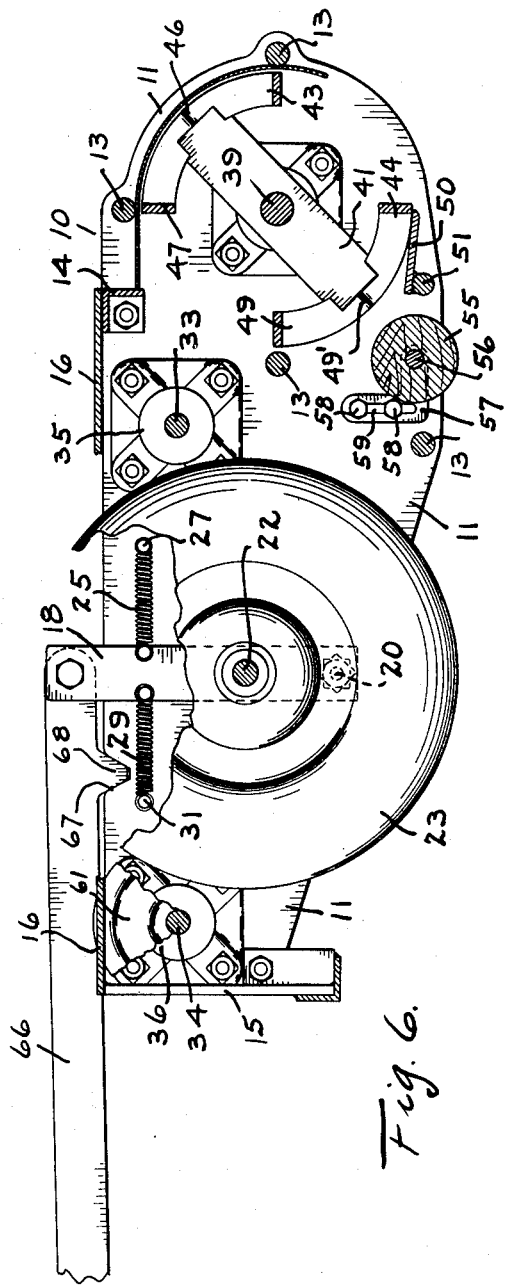
INVENTOR,
THOMAS E. BASH,
By Herbert A. Minturn,
ATTORNEY.

Patented July 29, 1952

2,604,747

UNITED STATES PATENT OFFICE 2,604,747

POWER-DRIVEN LAWN MOWER

Thomas E. Bash, Carthage, Ind.

Application January 7, 1948, Serial No. 1,012

9 Claims. (Cl. 56—26)

This invention relates to a mower of the type adapted to cut lawn grass and similar vegetation. A primary object of the invention is to provide a power-driven structure which will not only cut grass in a most satisfactory manner, but will be very easily guided and controlled under all possible conditions encountered in the cutting operations. A further primary object of the invention is to provide a mower construction wherein simple pressure of the guiding handle may cause the mower to turn to the right or left in a forward motion, and similarly to the right or left in a rear motion, all by manipulation of the handle without having to exert that energy which would otherwise be required to push bodily the entire construction. In other words, the mower itself is power driven to bodily transport the mower over the ground during the cutting operation.

A still further important object of the invention is to provide a cutting member such as a cutting cylinder which will facilitate the cutting operation to have a cutting member in contact with a second cutting member at all times. In the form of the invention herein shown, this cutting member is of a type resembling the normally employed cylindrical reel, but the cutting edge itself is arranged in an entirely different manner than that which has customarily heretofore been employed. The reel contains a plurality of these cutting members which will register with a ledger plate or a relatively stationary member to set up the required shearing action at the cutting zone. At no time is the mower itself bodily lifted in order to turn it, but on the contrary such lifting is entirely impossible by reason of the structure entering into the invention.

These and many other objects and advantages of the invention will become apparent to those versed in the art in the following description of one particular form of the mower as illustrated in the accompanying drawings, in which Fig. 1 is a view in front elevation of a structure embodying the invention;

Fig. 2, a fragmentary view in side elevation;

Fig. 3, a view in top plan with the driving motor removed;

Fig. 4, a detail in vertical section on the line 4—4 in Fig. 3;

Fig. 5, a detail in section on the line 5—5 in Fig. 2;

Fig. 6, a fragmentary vertical longitudinal section on the line 6—6 in Fig. 3;

Fig. 7, a view in front elevation of the cutting reel; and

Fig. 8, a detail of a modified form of friction drive in top plan view.

Referring to the drawings, in which like characters of reference indicate like parts throughout the several views, I form a frame generally designated by the numeral 10 to have two side plates 11 and 12. These side plates 11 and 12 are interconnected between their front portions by a plurality of bars or rods 13 herein shown as three in number. Also there is fixed an angle iron 14 between the two plates and interconnected therewith at the upper edge portions of these plates. Then interconnecting these plates 11 and 12 across their rear ends is a vertically disposed plate 15. In the present form of the invention, these plates 11 and 12 are sheet metal members one parallel with the other. Across the top of the frame-work thus formed is a motor mounting plate member 16, its forward end resting upon the cross angle iron 14, and its rear end resting upon the top edge of the vertically disposed plate 15.

A power plant of some nature, such as an electric motor or a gas engine, is provided to drive the mower. In the present form as herein shown, this motor is shown in the form of a gas engine 17 and is secured to the top side of the plate 16.

A rocker arm 18, Fig. 6, is rockably mounted by means of a pivot bolt 20 by its lower end to the plate 11 near the lower edge portion of that plate. The arm 18 is mounted to be slidable along the inner face of the side plate 11 as it is rocked about its pivot bolt 20. In the same manner, an arm 19 is rockably mounted on the plate 12 about a bolt 21 which is carried by the plate 12 near its lower edge portion. These two arms 18 and 19 normally extend vertically upwardly to have an axle carried by its respective ends in these arms 18 and 19. This axle designated by the numeral 22 has mounted on it adjacent these respective arms the wheels 23 and 24 each to be individually revoluble on the axle. These wheels 23 and 24 are preferably tired with pneumatic tires.

The ends of the axle 22 are carried through these arms 18 and 19 at corresponding elevations above the respective pivot bolts 20 and 21 but at a distance below the upper ends of those arms. Thus by rocking these arms 18 and 19, the axle 22 may be shifted forwardly in a parallel relation to its initial or so called "neutral" position, or one arm 18 or the other arm 19 may be rocked independently of the other so as to shift the axle 22 to an angular position in respect to this neutral position. The fitting of the ends of the axle 22 to these arms 18 and 19 is made to be such that this angular shifting of the axle 22 is permitted.

To maintain these arms 18 and 19 in the neutral positions, springs 25 and 26 are respectively connected by their rear ends to the arms 18 and 19 and by their forward ends to posts 27 and 28 in turn secured respectively to the side plates 11 and 12, Fig. 3. Then springs 29 and 30 are respectively connected by their forward ends to the arms 18 and 19, and by their rear ends to the posts 31 and 32 in turn connected or fixed to the side plates 11 and 12. These springs are under sufficient tension to maintain the arms 18 and 19 in these vertically disposed, or neutral, positions.

A pair of shafts 33 and 34 are revolubly mounted by their ends to be carried by the respective plates 11 and 12, and to be in parallel relation one with the other, and also with the normal or neutral position of the shaft 22. On these shafts 33 and 34 there are fixed respectively rollers or pulleys 35 and 36 to be in central alignment with the wheel 23. Similarly, there are pulleys 37 and 38 fixed on these shafts 33 and 34 to be in central alignment with the wheel 24. Normally these pulleys 35, 36 and 37, 38 are not in contact with the respective wheels 23 and 24 when the arms 18 and 19 are in their vertically disposed positions. However, the pulleys are so located that when the axle 22 is pulled rearwardly by simultaneous rocking of both arms 18 and 19, both wheels will simultaneously contact the rear rollers 36 and 38. Likewise, when the two arms 18 and 19 are rocked to the same degree forwardly, the wheels 23 and 24 are brought into compressive contact with the respective rollers 35 and 37. Then there is the other action wherein wheel 23 may be selectively rocked against the rear pulley 36, for example, while the wheel 24 is left in its neutral position or shifted against the roller 37. In like manner, the axle 22 may also be shifted from its normal position to bring the wheel 23 into contact with the roller 35 without bringing the wheel 24 into contact with the roller 37, or the wheel 24 may be brought back into contact with the roller 38. The results of these actions will be further explained hereinafter.

A reel shaft 39 is revolubly mounted on the side plates 11 and 12 to extend therebetween in parallel alignment with the shafts 33 and 34. This shaft 39 is fixed centrally of the circumference of a circle on which the three cross bars 13 are located. The shaft 39 has fixed to it a central disc 40 and end arms 41 and 42. Mounted on these three members 41, 42, and also the central disc member 40 are a plurality of cutting knives, herein shown as four in number. These knives while being helically formed are mounted in a peculiar manner. For example, the blade 43 has an end joined to a blade 44 at the juncture 45. Then from this juncture 45, the two blades 43 and 44 curve in opposite directions to form a gradually diverging V structure. The outer edges of these two blades 43 and 44 are maintained in a generated surface of a cylinder, and the other end of the blade 43, Fig. 7, shown relatively as the right hand end joins at the juncture 46 with a third one of these cutting blades 47 which in turn diverges in a V like manner from the blade 43 to terminate at the juncture 48 and merge into the fourth blade 49 which diverges back to the right again from the blade 47 to join with the blade 44 at the end juncture 49'.

By reason of this peculiar construction of the cutting reel, there is always an edge of one of the four blades in contact with the lower and relatively stationary plate or cutter bar 50. However, this contact between one of the cylinder or reel blades and the plate 50 is in a manner which zigzags from one end to the other of the plate 50. That is to say, taking the blade 43 as an example, it will initially strike the plate 50 at the juncture 45 and then continue that contact across to the right of the mower till the juncture end 46 reaches the plate 50 whereupon the next blade 47 therebehind will follow through with the contact back to the left side again, so on around the reel. The ledger plate or stationary blade 50 as it is so called is mounted by its ends on a cross shaft 51. This shaft 51 extends through one of the side plates at least, herein shown as through the side plate 12, Fig. 2, to have fixed on its outer end in an adjustable manner a rocker arm 52 which normally is pushed downwardly by its rear free end by means of a compression spring 53 which abuts a stop 54 fixed to the side plate 12 and the top side of the lever 53 whereby the forward edge of the plate 50 is normally urged upwardly into compressive contact with each of the four cutting blades 43, 47, 49, and 44 as they revolve thereover. In other words, there is the usual self-sharpening, or so called self-sharpening feature maintained.

Behind the plate 50, there is mounted a series of transversely aligned rollers 55, all on a common transverse shaft 56. It is on these rollers 55 that the mower is supported by its forward portion to prevent rocking downwardly beyond a predetermined amount around the axle 22.

The ends of the shaft 56 are carried by L-shaped brackets 57, the rear portions of which brackets are turned substantially vertically upwardly to carry bolts 58 through a slot 59 whereby the brackets may be adjusted vertically in reference to these bolts 58 which in turn are carried through the respective side members 11 and 12. In other words, by use of this bracket construction supporting the shaft 56, the rollers 55 are relatively adjusted in reference to the under edges of the side plates 11 and 12 and thereby control the height of the plate 50 above the ground over which the mower is driven.

From the drive pulley 159 of the motor 17 there extends a belt 60 down to wrap around the driven pulley 61 which is fixed to the shaft 34. The shaft 34 extends on through the side plate 12 to carry a sprocket 62 on its outer right hand end. Likewise, the shaft 33 extends on through the side plate 12 to carry on its outer end a sprocket 63. The reel shaft extends through the plate 12 likewise and has fixed on its outer right hand end a sprocket 64. In the driving arrangement herein shown, the sprockets 62 and 63 are of a common diameter while the sprocket 64 is of a greater diameter. A chain 65 engages around the sprocket 62 to pass by its upper flight under the sprocket 63 but to be in engagement therewith, and then continues to wrap around the forward side of the sprocket 64 to extend by a lower flight on around and back to the sprocket 62, Fig. 2. Thus, it is to be seen that the shafts 33, 34, and 39, are constantly driven while the motor 17 is in operation. It is also to be observed that the shaft 33 travels in a reverse direction from that of the shaft 34.

A handle of some construction is provided to interengage by forward portions with the respective arms 18 and 19. In the form herein shown, the handle is formed to have a general U-shape and is designated by the numeral 66. The forward ends of the handle 66 engage respectively in a rockable manner with the top end portions of the arms 18 and 19. Each of the side plates 11 and 12 is provided with a V notch 67 into which a lug 68 carried on the under edge portion of the handle legs may drop and by reason of the V notch and the corresponding shape of the lug 68, the arms 18 and 19 will be maintained in their vertical or neutral positions when the lug 68 is seated in the notch 67 on each side. This seating of the lug 68 in the notch 67 is accomplished when the handle 66 may be dropped to rest in a substantially horizontally disposed position as indicated in Fig. 6. The normal operating position is in the upper and rearwardly inclined position as indicated in Fig. 2.

Now in operating the device, assuming that the motor 17 is operating, the shafts 33, 34, and 39 are revolving as above indicated, as long as the handle 66 is in the neutral position as indicated in the several views of the drawing.

The direction of travel of the belt 60 is such that the shaft 34 is driven in a clockwise direction, Fig. 2, and therefore the shaft 39 is likewise driven in a clockwise direction to give the proper direction of rotation to the reel. With the shaft 34 turning in a clockwise direction, the shaft 33 will be turning in a counter-clockwise direction. Then when the motor is in operation as above indicated, and it is desired to proceed with the mowing operation, the handle 66 is pushed forwardly by its handle bar 69 so as to push the wheels 23 and 24 against the pulleys or rollers 35 and 37. By reason of the compressive, frictional pressure therebetween, the wheels 23 and 24 will then be turned in a forward or clockwise direction so as to start the entire device into forward motion. As long as the slight pressure is maintained on the handle bar 69 as above indicated, this direction of rotation will be maintained. Likewise, it is to be observed that both wheels 23 and 24 are simultaneously pressed toward the pulleys 35 and 37 so that the direction of travel is straight ahead, and the pressure on each wheel then being substantially the same amount. When it is desired to stop the mower, pressure on the handle bar 69 is removed to allow the springs 29 and 30 to return the arms 18 and 19 to their vertical, neutral positions whereupon no power is transmitted to the respective wheels 23 and 24.

To reverse the direction of travel of the mower, that is to back up, the handle bar 69 is simply pulled rearwardly slightly to bring the wheels 23 and 24 into contact with the rollers 36 and 38, whereupon power is then transmitted from those rollers to the wheels to cause the reverse direction of rotation thereof. To cause the mower to be turned to the left, pressure on the handle bar 69 is made to be such that it is slightly rocked to pull the wheel 23 back against the roller 36 and push the wheel 24 against the roller 37, whereupon the mower will immediately take the left hand direction of travel. The degree of pressure upon each of the wheels may be controlled by the degree of rocking of the handle bar 69 from left to right. Obviously, both wheels do not have to be driven at the same time, depending upon how sharp a turn is to be made. For example, the wheel 23 may be rocked back against the roller 36 whereupon the mower will in effect back up to make the turn and pivot on the wheel 24. If the wheel 24 is pushed ahead without moving the wheel 23, then the wheel 24 will proceed ahead to cause the mower to pivot around on the wheel 23 in a slower manner than if the wheel 23 were pulled back against the roller 36. In any event, the degree of turning and the rapidity thereof may be simply controlled by the position into which the handle bar 69 is carried so that the pressure of the wheel 23 or the pressure of the wheel 24 against the respective rollers may be varied to produce the desired degree of transmission of power. In other words, there may be some slippage permitted or the wheels may be brought against the rollers more firmly to secure the full transmission of power.

The rocking of the handle bar 69 from left to right is a very simple matter and requires exceedingly little power to cause the turning effect in the wheels 23 and 24. Of course, the entire mower may be stopped in respect to its travel over the ground by allowing the handle 66 to return to its normal position, or it may simply be dropped whereupon the arms 18 and 19 are brought into their neutral positions by means of the registry of the lug 68 in the notch 67, Fig. 2, as above explained.

While the power transmission to the wheels 23 and 24 has been shown and described as simple cylindrical rollers brought relatively into contact with the wheels which are indicated as being pneumatically tired, it is entirely possible to use other frictional devices to transmit the power in the same manner as between the shafts 33 and 34 and the two wheels. For example, as indicated in Fig. 8, a pair of spaced apart discs 70 and 71 may be mounted in a fixed manner on the shaft 34 adjacent one of the wheels, herein shown as wheel 24. The inner-outer peripheral margins of these discs 70 and 71 are tapered from the inside toward the outer edge to provide a wedge-shape opening between the two discs 70 and 71. Then a wheel 72 is fixed on the wheel 24, herein shown as adjacent the wheel 24. This wheel 72 has opposing faces sloping from the outer faces of the wheel proper inwardly toward the central plane of the wheel. In other words, these sloping faces 73 and 74 on the respective sides of the wheel 72 may be pressed against the corresponding sloping faces 75 and 76 of the discs 70 and 71 by pushing the shaft 22 theretoward so that power may be frictionally transmitted then between the shaft 34 and the wheel 24. This driving device can, of course, be substituted in place of each of the rollers 35, 37, 36, and 38.

While I have herein shown and described the invention in the one particular form, it is obvious that mechanical changes may be made without departing from the spirit of the invention, and I, therefore, do not desire to be limited to that precise form beyond the limitations which may be imposed by the following claims.

I claim:

1. A power driven mower comprising the combination with a pair of side members; a cutting reel revolubly carried by said members on a fixed axis in respect thereto; and a driving motor carried by said members; of a pair of wheels; an axle carrying said wheels separately revoluble thereon; an arm rockably supported by each of said side members and also individually rockably engaging said axle at spaced apart zones therealong said axle being mounted to be selectively shifted by said arms from a position parallel to said axis to positions inclined therefrom both fore and aft of the parallel position; a drive means positioned in the paths of said wheels to be spaced therefrom forwardly and rearwardly of said axle drivingly connecting with said wheels upon selective rocking of said arms; means driven by said motor drivingly connecting with each of said drive means and said reel; and a handle control interconnecting said arms to control said arm rocking.

2. A power driven mower comprising in combination with a pair of side members; a cutting reel revolubly carried by said members; and a driving motor carried by said members; of a pair of wheels; an axle carrying said wheels; an arm rockably supported by each of said side members and also engaging said axle at spaced apart zones therealong; a drive means positioned forwardly and rearwardly of said axle drivingly connecting with said wheels upon selective rocking of said arms; and means driven by said motor drivingly connecting with each of said drive means and said reel; yieldable means normally maintaining said arms in a neutral, drive means disconnected condition; and handle control means connected to said arms.

3. A power driven mower comprising in combination with a pair of side members; a cutting reel revolubly carried by said members; and a driving motor carried by said members; of a pair of wheels; an axle carrying said wheels; an arm rockably supported by each of said side members and also engaging said axle at spaced apart zones therealong; a drive means positioned forwardly and rearwardly of said axle drivingly connecting with said wheels upon selective rocking of said arms; and means driven by said motor drivingly connecting with each of said drive means and said reel; yieldable means normally maintaining said arms in a neutral, drive means disconnected condition; and handle control means connected to said arms; said handle being hinged to said arms; and interlocking means between said handle and one of said side members for retaining said handle in said neutral condition in opposition to said yieldable means.

4. A power driven mower comprising in combination with a pair of side members; a cutting reel revolubly carried by said members; and a driving motor carried by said members; of a pair of wheels; an axle carrying said wheels; an arm rockably supported by each of said side members and also engaging said axle at spaced apart zones therealong; a drive means positioned forwardly and rearwardly of said axle drivingly connecting with said wheels upon selective rocking of said arms; and means driven by said motor drivingly connecting with each of said drive means and said reel; yieldable means normally maintaining said arms in a neutral, drive means disconnected condition; and handle control means connected to said arms; said handle being hinged to said arms; and interlocking means between said handle and one of said side members for retaining said handle in said neutral condition in opposition to said yieldable means; said interlocking means comprising a tapered lug entering a wedge-shaped notch to guide said handle to said neutral position, and said interlocking means operating to carry the handle to said neutral position upon dropping of said handle to a position below that at which it is normally operated.

5. In a power driven mower, the combination with a pair of spaced apart side members, a reel revolubly mounted between said members, a ledger plate under said reel, and a drive motor carried by said side members; of a pair of spaced apart substantially parallel drive shafts revolubly carried by said members; a pair of drive wheels; an axle on which said wheels are individually, revolubly mounted; an arm rockably mounted on each of said side members, said axle being positioned between said drive shafts, and further interengaging with said arms whereby equal degree of rocking simultaneously of both of said arms may shift the axle forwardly and rearwardly in substantially parallel alignment with said drive shafts, and unequal degree of rocking of said arms may shift the axle to non-parallel positions in respect to the drive shafts; elastic means normally retaining both of said arms in neutral positions to maintain said axle in parallel alignment with said drive shafts; means drivingly interconnected with said motor, to revolve said drive shafts, and said reel, one of said drive shafts being driven in a direction opposite to that of the other drive shaft; friction driving means at spaced zones on each of said drive shafts; and handle guide means connected to said arms for rocking said arms in opposition to said elastic means to shift said axle for driving connection selectively between said friction means and said wheels.

6. In a power driven mower, the combination with a pair of spaced apart side members, a reel revolubly mounted between said members, a ledger plate under said reel, and a drive motor carried by said side members; of a pair of spaced apart substantially parallel drive shafts revolubly carried by said plates; a pair of drive wheels; an axle on which said wheels are individually, revolubly mounted; an arm rockably mounted on each of said side members, said axle being positioned between said drive shafts, and further interengaging with said arms whereby equal degree of rocking simultaneously of both of said arms may shift the axle forwardly and rearwardly in substantially parallel alignment with said drive shafts, and unequal degree of rocking of said arms may shift the axle to non-parallel positions in respect to the drive shafts; elastic means normally retaining both of said arms in neutral positions to maintain said axle in parallel alignment with said drive shafts; means drivingly interconnected with said motor, to revolve said drive shafts, and said reel, one of said drive shafts being driven in a direction opposite to that of the other drive shaft; friction driving means at spaced zones on each of said drive shafts; and handle guide means connected to said arms for rocking said arms in opposition to said elastic means to shift said axle for driving connection selectively between said friction means and said wheels; said friction driving means being in a path of fore and aft shifting of each of said wheels, whereby said driving connection therebetween is made directly between the periphery of the wheel and the friction means.

7. In a power driven mower, the combination with a pair of spaced apart side members, a reel revolubly mounted between said members, a ledger plate under said reel, and a drive motor carried by said side members; of a pair of spaced apart substantially parallel drive shafts revolubly carried by said plates; a pair of drive wheels; an axle on which said wheels are individually, revolubly mounted; an arm rockably mounted on each of said side members, said axle being positioned between said drive shafts, and further interengaging with said arms whereby equal degree of rocking simultaneously of both of said arms may shift the axle forwardly and rearwardly in substantially parallel alignment with said drive shafts, and unequal degree of rocking of said arms may shift the axle to non-parallel positions in respect to the drive shafts; elastic means normally retaining both of said arms in neutral positions to maintain said axle in parallel alignment with said drive shafts; means drivingly interconnected with said motor, to revolve said drive shafts, and said reel, one of said drive shafts being driven in a direction opposite to that of the other drive shaft; friction driving means at spaced zones on each of said drive shafts; and handle guide means connected to said arms for rocking said arms in opposition to said elastic means to shift said axle for driving connection selectively between said friction means and said wheels; and a friction driven member for each wheel carried therewith into engagement with the said respective friction drive means upon travel of said wheels theretoward.

8. In a power driven mower, the combination of a pair of drive wheels; wheel mounting means permitting each wheel to be shifted in a fore and aft direction in respect to the other; an arm for shifting each wheel; a friction drive means for each wheel operatively connecting therewith upon said shifting of the wheel theretoward in each direction; a cutting reel; motor means driving said reel and said friction drive means; and handle means connecting with said arms; each of said friction drive means comprising a pair of drive members, one forward and one to the rear of the axis of the wheel, one of the drive members being oppositely turned from the other.

9. In a power driven mower, the combination of a pair of drive wheels; wheel mounting means permitting each wheel to be shifted in a fore and aft direction in respect to the other; an arm for shifting each wheel; a friction drive means for each wheel operatively connecting therewith upon said shifting of the wheel theretoward in each direction; a cutting reel; motor means driving said reel and said friction drive means; and handle means connecting with said arms; each of said friction drive means comprising a pair of drive members, one forward and one to the rear of the axis of the wheel, one of the drive members being oppositely turned from the other; and spring means normally retaining said arms in positions of non-wheel drive connections with said friction drive means.

THOMAS E. BASH.

REFERENCES CITED

The following references are of record in the file of this patent:

UNITED STATES PATENTS

| Number | Name | Date |
|---|---|---|
| 381,215 | Collett | Apr. 17, 1888 |
| 1,437,508 | Fletcher | Dec. 5, 1922 |
| 1,441,073 | English, Jr. | Jan. 2, 1923 |
| 1,452,730 | Dremel | Apr. 24, 1923 |
| 1,493,223 | Peters | May 6, 1924 |
| 1,610,444 | Hodges | Dec. 14, 1926 |
| 2,514,917 | Walstrom | July 11, 1950 |